United States Patent
Zhu et al.

(10) Patent No.: US 6,803,783 B2
(45) Date of Patent: Oct. 12, 2004

(54) TIME BORROWING USING DYNAMIC CLOCK SHIFT FOR BUS SPEED PERFORMANCE

(75) Inventors: Zhubiao Zhu, Fort Collins, CO (US); Kenneth Koch, Fort Collins, CO (US); John R. Spencer, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/355,559

(22) Filed: Jan. 31, 2003

(65) Prior Publication Data

US 2004/0150426 A1 Aug. 5, 2004

(51) Int. Cl.[7] .................. H03K 17/06; H03K 19/003
(52) U.S. Cl. ..................... 326/30; 326/30; 326/86; 326/56; 326/57; 326/58; 326/90
(58) Field of Search .................. 326/30, 86, 90, 326/56–58, 95, 98; 327/112, 292, 293, 295

(56) References Cited

U.S. PATENT DOCUMENTS

| | | | |
|---|---|---|---|
| 5,418,935 A | 5/1995 | Whittaker et al. | |
| 5,517,136 A | 5/1996 | Harris et al. | |
| 5,671,369 A | 9/1997 | LaBerge et al. | |
| 5,796,282 A | 8/1998 | Sprague et al. | |
| 6,192,426 B1 | 2/2001 | Kando et al. | |
| 6,201,415 B1 * | 3/2001 | Manglore | 326/98 |
| 6,271,684 B1 * | 8/2001 | Rogenmoser | 326/95 |
| 6,323,688 B1 * | 11/2001 | Podlesny et al. | 326/98 |
| 6,346,828 B1 * | 2/2002 | Rosen et al. | 326/56 |
| 6,392,466 B1 | 5/2002 | Fletcher | |
| 6,448,818 B1 | 9/2002 | Fletcher | |

OTHER PUBLICATIONS

Search Report, dated Jun. 1, 2004.

* cited by examiner

*Primary Examiner*—Vibol Tan (57) ABSTRACT

An apparatus and method for increasing the performance of a common-clock data bus is provided by borrowing time from the common-clock domain timing. The time may be borrowed by dynamically delaying the common-clock before providing it to a receiving path. In a system comprising a plurality of logic devices electrically coupled to a data bus, time may be borrowed from the internal common-clock timing domain of one of the plurality of logic devices when receiving data through the data bus from an external logic device. To prevent race conditions, a logic device of the plurality of logic devices may be configured to switch off the time borrowing when receiving data from an internal driving path. To avoid glitches, the logic device may be configured to switch the time borrowing feature on and off only at select time intervals.

22 Claims, 5 Drawing Sheets

TIME BORROWING USING DYNAMIC CLOCK SHIFT FOR BUS SPEED PERFORMANCE

BACKGROUND

Advances in semiconductor manufacturing technologies have allowed circuit designers to continually improve the clock performance of high-speed logic devices including, but not limited to, microprocessors. Thus, microprocessor core clock speeds have continued to increase. However, partly due to the difficulty of increasing data bus speeds, systems having a plurality high speed logic devices interconnected through a data bus have not experienced the same degree of improved performance.

Figure 1:
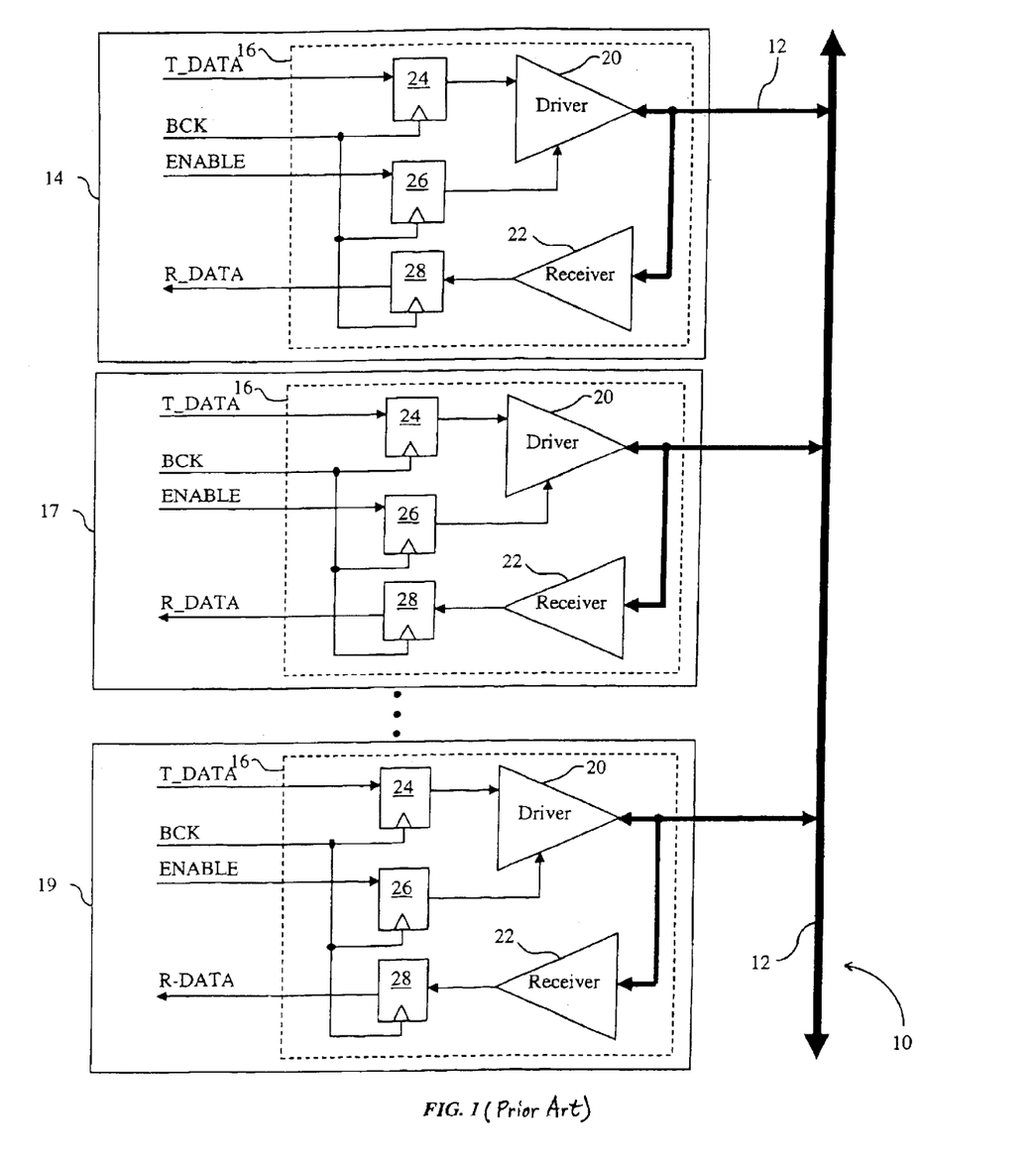
FIG. 1 is a schematic diagram of a system employing a plurality of exemplary interface circuits.

For purposes of discussion, FIG. 1 illustrates a system 10 comprising a data bus 12 electrically coupled to a plurality of high speed logic devices 14, 17, 19. Each logic device 14, 17, 19 is electrically coupled to the data bus 12 through an exemplary bus interface circuit 16. In order to coordinate the transfer of data between each of the logic devices 14, 17, 19, the system 10 may use a common-clock timing scheme and a source synchronous timing scheme, both of which are well known in the art. Typically, the common-clock timing scheme is the critical timing path, slowing the speed of data transfers between logic devices 14, 17, 19 and, therefore, the overall speed of the system 10.

The exemplary interface circuit 16 comprises a driver 20 and a receiver 22 electrically coupled to the data bus 12. The driver 20 is configured to receive a $T_{13}DATA$ signal from its corresponding logic device 14, 17, 19 and to transmit the $T_{13}DATA$ signal to the data bus 12. Typically, the $T_{13}DATA$ signal is latched to the driver 20 through a register 24 controlled by a clock signal BCK. The driver 20 may also be configured to transmit the $T_{13}DATA$ signal to the data bus 20 only upon receiving an ENABLE signal. Like the $T_{13}DATA$ signal, the ENABLE signal may be latched to the driver 20 through a register 26 controlled by the clock signal BCK. As used herein, the term "driving path" refers to the driver 20 and the registers 24, 26, collectively or individually. Similarly, the each of the registers 24 and 26 may be referred to as a "driving path register". The receiver 22 is configured to receive an $R_{13}DATA$ signal from the data bus 12 and to transmit the $R_{13}DATA$ signal to a register 28. The receiving path register 28 is also configured to pass the $R_{13}DATA$ signal to its corresponding logic device 14, 17, 19. As used herein, the term "receiving path" refers to the receiver 22 and the register 28, collectively or individually. Similarly the register 28 may be referred to as a "receiving path register".

In a common-clock timing scheme, a single clock is shared by the driving and receiving elements coupled to a data bus. As shown in FIG. 1, each exemplary interface circuit 16 employs a common-clock timing scheme wherein the driving path registers 24, 26 and the receiving path registers 28 are controlled by the same clock signal BCK. Sharing the clock signal BCK between the driving path registers 24, 26 and the receiving path registers 28 places a theoretical limit on the maximum frequency at which the common-clock data bus 12 can operate. The limitation stems from the total delay introduced between a driving path and a receiving path of the interface circuits 16.

Figure 2:
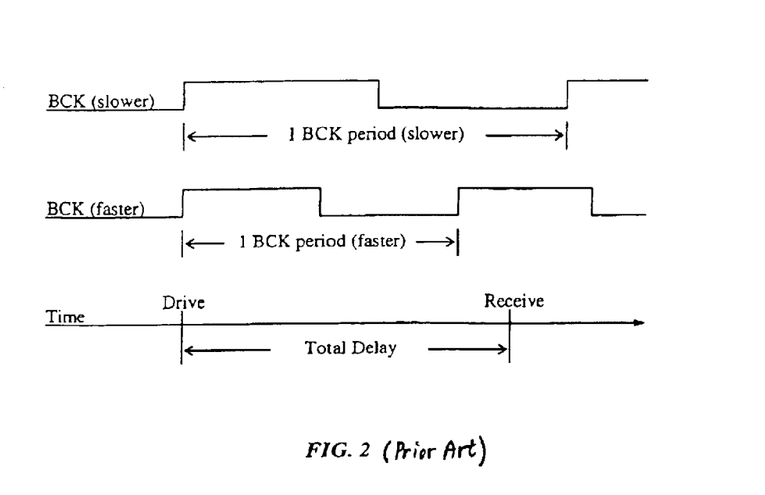
FIG. 2 is a timing diagram showing two clock signals in relation to a total delay time corresponding to the system of FIG. 1.

To illustrate the maximum frequency limitation, FIG. 2 shows a timing diagram with two clock signals, BCK (slower) and BCK (faster), having different periods. FIG. 2 also shows a time line illustrating the times when a bit of data of the $T_{13}DATA$ signal is driven by a driver 20 and received by a receiver 22 in relation to the two clock signals. The elapsed time between the time when the bit is driven and the time when it is received is referred to herein as the "total delay" or "total delay time" of the signal. The driving path registers 24, 26 are configured to pass the a bit to the driver 20 upon a first positive transition of the clock signal BCK (slower) and the receiving path register 28 is configured to latch in the bit from the receiver 22 upon a second positive transition of the clock signal BCK (slower). To ensure correct latching, the receiver 22 may be configured with setup and hold requirements that define the minimum times that the received bit must be held in the receiving path register 28 before and after a positive transition of the clock signal BCK (slower).

One skilled in the art will recognize that the bit driven at the first positive transition of the clock signal BCK (slower) must be received at the receiver before the second transition of the clock signal BCK (slower) in order to be latched into the receiving path register 28 correctly. Otherwise, a subsequent bit may be received at the receiver 22 before the bit is latched into the receiving path register 28 or a previous bit may be latched into the receiving path register 28 more than once. As used herein, the term "race" refers to the condition wherein a first bit is received at the receiver 22 but is not latched into the receiving path register 28 before a second bit is received at the receiver 22. Thus, the total delay must remain less than the delay of one cycle of the clock signal BCK (slower). As shown in the example in FIG. 2, this requirement is met. However, if the registers 24, 26, 28 of FIG. 1 are controlled by the higher frequency clock signal BCK (faster), the total delay may be greater than the delay of one cycle of the clock signal BCK (faster), causing race or other timing problems. Therefore, the maximum frequency at which the common-clock data bus 12 can operate is limited to clock signals having periods greater than the total delay.

Referring again to FIG. 1, to design a common-clock data bus 12, each factor contributing to the total delay must be accounted for to determine a common-clock timing budget, or minimum allowable cycle for the clock signal BCK. The total delay of the $T_{13}DATA$ signal comprises the sum of the delays introduced by each element of the system through which the $T_{13}DATA$ signal passes. Thus, a $T_{13}DATA$ signal passing through fewer system elements will have less total delay than a $T_{13}DATA$ signal passing through more system elements. For example, the total delay of a $T_{13}DATA$ signal communicated between the driver 20 and the receiver 22 of the same logic device, such as logic device 14, may include delays introduced by the driving path registers 24, 26, the driver 20, the receiver 22, and the receiving path register 28 of logic device 14. However, the total delay of a $T_{13}DATA$ signal communicated between logic device 14 and logic device 17 may include delays introduced by the driving path registers 24, 26 and the driver 20 of logic device 14, the packaging (not shown) of logic device 14, the length of printed circuit board traces (not shown) of the data bus 12, the packaging (not shown) of logic device 17, and the receiver 22 and receiving path register 28 of logic device 17. Further, due to the delay introduced by the length of the printed circuit board traces of the data bus 12, logic devices 14, 17, 19 that are the farthest away from each other on the data bus 12 will experience the greatest delay when communicating a $T_{13}DATA$ signal between each other.

Once the common-clock timing budget is determined, it may be desirable to increase the maximum frequency at which the common-clock data bus 12 can operate by decreasing the total delay time along any given communication path. Thus, it may be advantageous to shorten the length of printed circuit board traces in the data bus 12 or to shorten packaging leads. However, the amount of delay eliminated from such measures may be minimal. It may also be advantageous to reduce the propagation delays of the registers 24, 26, 28, the drivers 20, and the receivers 22 in FIG. 1 by decreasing their switching times (e.g., reducing the finite delay between the application of an input pulse and an output response). However, reducing propagation delays may create noise problems due to the high frequencies associated with slew rates.

SUMMARY

The present disclosure relates to increasing the speed of a common-clock data bus. An interface circuit configured to drive and receive data on a data bus according to an exemplary embodiment includes a common-clock provided to a driving path and a receiving path of the interface circuit and time borrowing circuitry electrically coupled to the receiving path. The time borrowing circuitry is configured to dynamically delay the common-clock before it is provided to the receiving path. In another embodiment, the time borrowing circuitry is configured to selectively provide the common-clock or the dynamically delayed common-clock to the receiving path. The time borrowing circuitry may be configured to provide the common clock, rather than the dynamically delayed common-clock, to the receiving path when the driving path is driving data onto the data bus. In yet another embodiment, the time borrowing circuitry is configured to selectively switch between providing the common-clock or the dynamically delayed common-clock only at select time intervals.

In another embodiment, the interface circuit comprises at least one driving path register coupled to a driver, a receiving path register coupled to a receiver, and a delay line coupled between a common-clock signal and a clock input of the receiving path register. The interface circuit may further comprise a multiplexer having an output coupled to the clock input of the receiving path register, the multiplexer configured to switch its output between the common-clock and the output of the delay line. The interface may further comprise a NOR gate electrically coupled to the common-clock and the output of the delay line and a latch electrically coupled to the output of the NOR gate. The NOR gate and latch may be configured to provide a signal to the multiplexer only when the common-clock and the output of the delay line are both at a low logic level.

A logic device according to another embodiment comprises an interface circuit including a driving path, a receiving path, and time borrowing circuitry. The time borrowing circuitry may be configured to dynamically delay a common-clock signal provided to the receiving path. A system according to another embodiment comprises a plurality of logic devices electrically coupled to a data bus, each logic device comprising a driving path, a receiving path, and a time borrowing circuitry. The time borrowing circuitry may be configured to provide a common-clock to the receiving path when a driving path of an external logic device is driving and to provide a dynamically delayed version of the common-clock signal to the receiving path when the driving path within the same logic device is driving.

Other features and advantages will become apparent to those of skill in the art through a consideration of the ensuing description, the accompanying drawings, and the appended claims.

DETAILED DESCRIPTION

Figure 3:
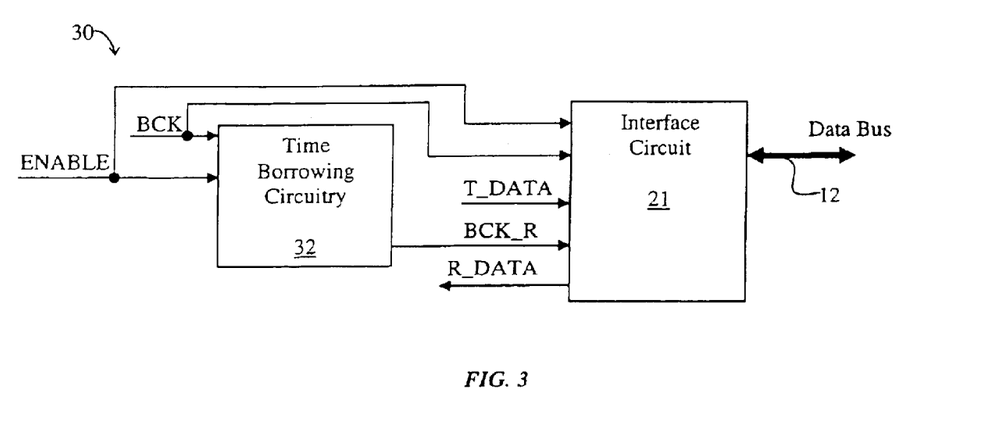
FIG. 3 is a block diagram of the interface circuit of FIG. 1 electrically coupled to time borrowing circuitry, according to an embodiment of the present invention.

FIG. 3 shows a block diagram of an improved device interface circuit 30 according to one embodiment of the present invention. The device interface circuit 30 comprises an exemplary interface circuit 21, electrically coupled to time borrowing circuitry 32. The time borrowing circuitry 32 is configured to receive a clock signal BCK, borrow lime from the clock signal BCK to create a receiver clock signal $BCK_{13}R$, and output the receiver clock signal $BCK_{13}R$ to the interface circuit 21. As discussed in greater detail below, the receiver clock signal $BCK_{13}R$ is configured to have a first positive transition corresponding to a first positive transition of the clock signal BCK and to have a second positive transition after a second positive transition of the clock signal BCK. In other words, the period of the receiver clock signal BCK R is configured to end after the period of the clock signal BCK ends. The time difference between the end of the clock signal BCK period and the receiver clock signal $BCK_{13}R$ period is referred to as "time borrowed" from the clock signal BCK domain timing. The time borrowing circuitry 32 may be configured to create the time difference by dynamically delaying the clock signal BCK and outputting the delayed signal as the receiver clock signal $BCK_{13}R$.

The clock signal BCK may be an inner-device bus clock, which typically has large timing margins. As used herein, a "timing margin" is the difference between the common-clock timing budget and the total delay. Therefore, it is possible to borrow time from the inner-device bus clock domain timing without reducing the integrity of the overall common-clock timing scheme.

The time borrowing circuitry 32 is configured to pass the receiver clock signal $BCK_{13}R$ to the clock input of a receiver path register (not shown), such as register 28 shown in FIG. 1. As will be discussed in greater detail below, the time borrowed allows the maximum frequency at which a common-clock data bus 12 can operate to be increased by allowing the time period of the clock signal BCK to be reduced to less than the common-clock timing budget. The time borrowing circuitry 32 may also be configured to pass a receiver clock signal $BCK_{13}R$ that is substantially identical to the clock signal BCK upon receipt of the ENABLE signal. Thus, the time borrowing circuitry 32 may be configured to selectively disable the time borrowing.

Figure 4:
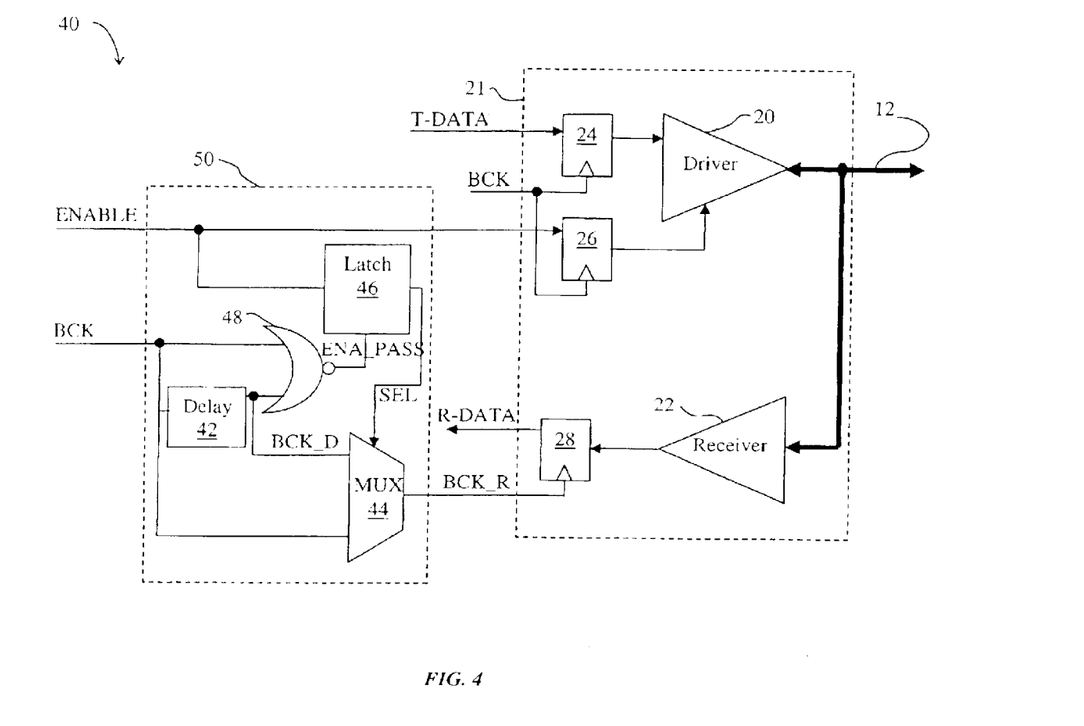
FIG. 4 is a schematic diagram of the interface circuit of FIG. 1 electrically coupled to time borrowing circuitry comprising a delay line configured to dynamically shift a clock signal, according to an embodiment of the present invention.

FIG. 4 shows a schematic diagram of an improved device interface circuit 40 according to another embodiment of the present invention. The device interface circuit 40 comprises an exemplary interface circuit 21, such as the interface circuit 21 shown in FIG. 3, electrically coupled to time borrowing circuitry 50. The time borrowing circuitry 50 is configured to receive a clock signal BCK, borrow time from the clock signal BCK using dynamic clock shift to create a receiver clock signal $BCK_{13}R$, and output the receiver clock signal $BCK_{13}R$ to the interface circuit 21. The time borrowing circuitry 50 comprises a delay line 42 electrically coupled to a multiplexer 44 and a NOR gate 48. The output of the NOR gate 48 is electrically coupled to the clock input of a latch 46 and the output of the latch is electrically coupled to the select line of the multiplexer 44. An ENABLE signal is electrically coupled to an input of the latch 46 and the clock signal BCK is electrically coupled to the respective inputs of the NOR gate 48, the delay line 42, and the multiplexer 44.

Figure 5:
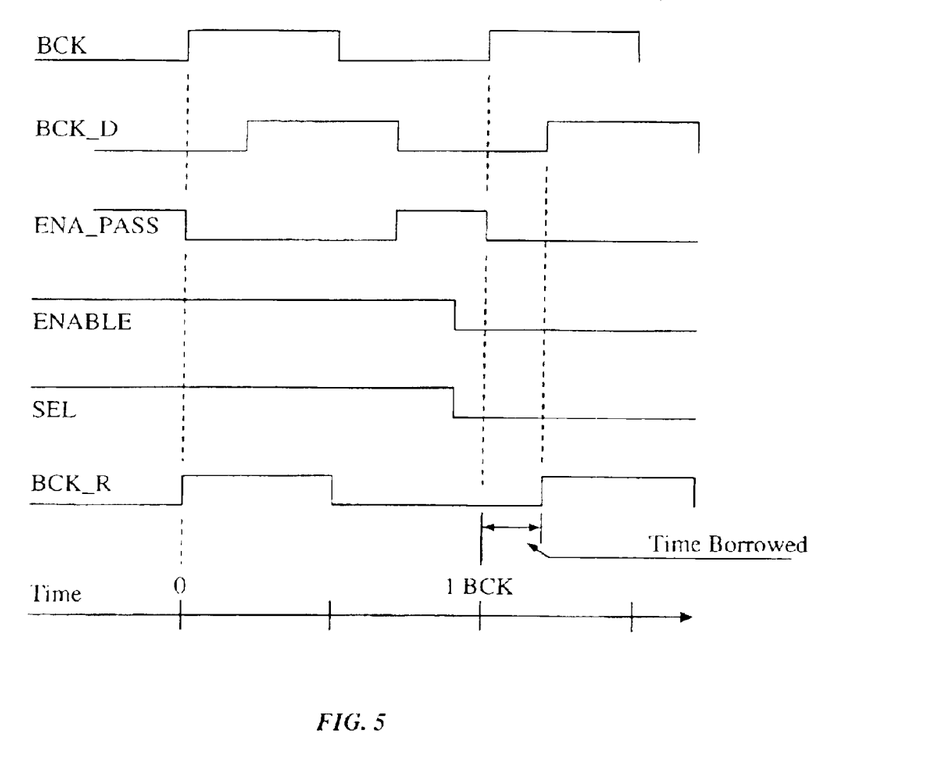
FIG. 5 is a timing diagram of various signals described in relation to FIG. 4.

Referring to FIGS. 4 and 5, a delay element or other appropriate delay circuit such as delay line 42 is configured to receive the clock signal BCK and to output a delayed clock signal $BCK_{13}D$. When the multiplexer 44 receives a low logic level signal SEL from the latch 46, the delayed clock signal $BCK_{13}D$ is passed to the clock input of the receiving path register 28 as receiver clock signal $BCK_{13}R$. As illustrated in the timing diagram shown in FIG. 5, the amount of time by which the clock signal BCK is delayed by the delay line 42 is equal to the amount of time borrowed. As discussed previously, the receiving path register 28 is configured to latch a bit from the receiver 22 when the receiver clock signal $BCK_{13}R$ undergoes a positive transition. Thus, even if the total delay of the bit in arriving at the receiver 22 is more than the period of the clock signal BCK by an amount less than the time borrowed, the positive transition of the receiver clock signal BCK will latch the bit into the receiving path register 28. Therefore, the common-clock timing budget may be increased from one clock signal BCK period to one clock signal BCK period plus the amount of time borrowed, allowing the maximum frequency at which the common-clock data bus 12 to be increased.

To avoid race conditions, it may be advantageous to selectively disable the time borrowing. The receiver 22 may receive a $T_{13}DATA$ signal from the driver 20 that is internal to the same interface circuit 21 or from a driver (not shown) that is externally coupled to the receiver through the data bus 12. This is especially true for a receiver 22 located within a front-side bus interface circuit 21. As discussed previously, the total delay of a $T_{13}DATA$ signal communicated between a driver 20 and a receiver 22 of the same logic device, such as logic device 14 shown in FIG. 1, may be much smaller than the total delay of a $T_{13}DATA$ signal communicated between two different logic devices, such as between logic devices 14 and 19 shown in FIG. 1. If the total delay of the $T_{13}DATA$ signal communicated between the driver 20 and receiver 22 of the same interface circuit 21 is less than the time borrowed, a race condition will occur. For example, the driver 20 may be configured to drive a first bit at time zero and a second bit at time 1 BCK, as shown in FIG. 5. However, if the total delay is less than the time borrowed, the second bit will arrive at the receiver 22 before the first bit is latched into the receiving path register 28. Therefore, it is advantageous to disable the time borrowing when the receiver 22 is receiving a $T_{13}DATA$ signal from an internal driver 20.

To prevent race, the time borrowing circuitry 50 is configured to disable the time borrowing using the ENABLE signal. When the driver 20 is driving, the ENABLE signal is at a high logic level, which causes the clock signal BCK to be passed through the multiplexer 44 as receiver clock signal $BCK_{13}R$. Therefore, the receiver clock signal $BCK_{13}R$ will be identical to the clock signal BCK and no time borrowing will occur.

The latch 46 and the NOR gate 48 are configured to prevent glitches on the receiver clock signal $BCK_{13}R$ when the ENABLE signal undergoes a positive transition too early, causing the multiplexer 44 to switch from the delayed clock signal $BCK_{13}D$ to the clock signal BCK. To prevent glitches, the multiplexer 44 is prevented from switching between its inputs until the delayed clock signal $BCK_{13}D$ and the clock signal BCK are both at low logic levels. When the delayed clock signal $BCK_{13}D$ and the clock signal BCK are both at low logic levels, the $ENA_{13}PASS$ signal at the output of the NOR gate 48 transitions to a high logic level. The $ENA_{13}PASS$ signal at a high logic level causes the latch 46 to latch the ENABLE signal at its input to the SEL signal at its output. Therefore, glitches on the receiver clock signal $BCK_{13}R$ are avoided by preventing the multiplexer 44 from switching its output from the delayed clock signal $BCK_{13}D$ to the clock signal BCK before both input signals are at a low logic level.

Figure 6:
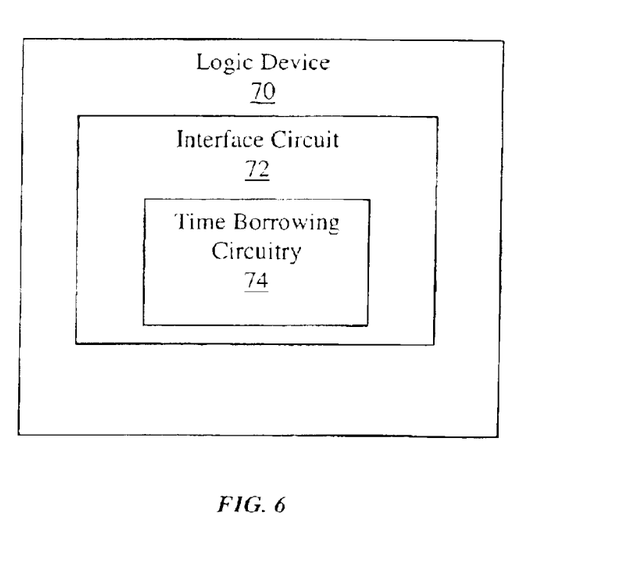
FIG. 6 is a block diagram of a logic device comprising an interface circuit having time borrowing circuitry, according to an embodiment of the present invention.

FIG. 6 illustrates a block diagram of a logic device 70 employing a device interface circuit 72. Device interface circuit 72 comprises time borrowing circuitry 74, such as the time borrowing circuitry 50 shown in FIG. 4. Logic device 70 may be used to produce the signals described in connection with FIGS. 3 through 5. Logic device 70 may comprise, by way of example only and not by limitation, a high speed digital processor.

Figure 7:
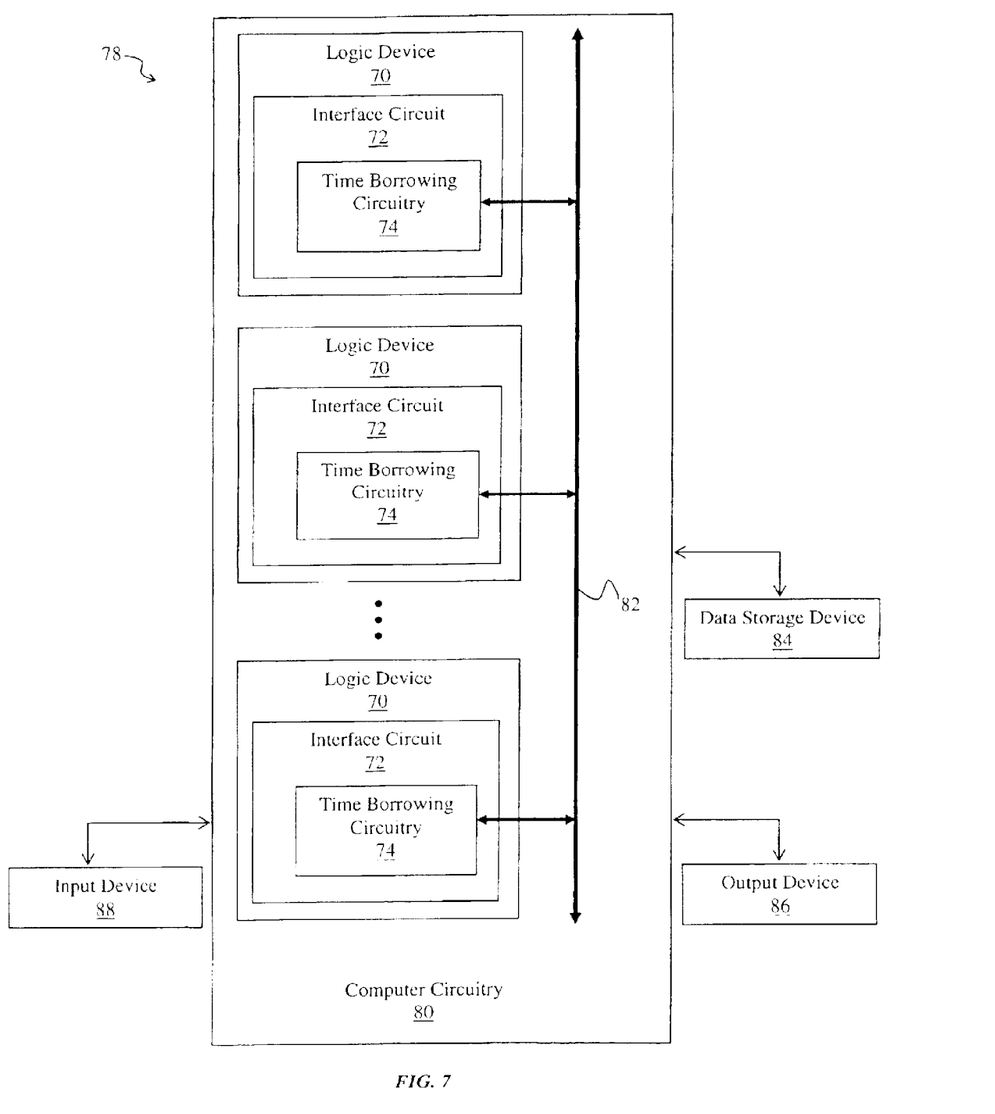
FIG. 7 is a block diagram of a computer system comprising a plurality of logic devices interconnected through a data bus, each logic device comprising an interface circuit having time borrowing circuitry, according to an embodiment of the present invention.

FIG. 7 illustrates a block diagram of a computer system 78 according to an embodiment of the present invention. Computer system 78 comprises computer circuitry 80, data storage devices 84, output devices 86, and input devices 88. Computer circuitry 80 typically performs computer functions such as executing software to perform desired calculations and tasks. Computer circuitry 80 comprises a plurality of logic devices 70 (three shown), such as the logic device 70 shown in FIG. 6, coupled to a data bus 82. Computer circuitry 80 may include additional elements (not shown) such as, for example, those used in configuring, controlling, or otherwise interacting with the plurality of logic devices and may further include a memory device (not shown) and one or more additional buses (not shown). Although not shown, one or more of the data storage devices 84, output devices 86, and input devices 88 may be electrically coupled to the data bus 82.

The data storage devices 84 may include, by way of example only, drives that accept hard and floppy discs, tape cassettes, CD-ROM, or DVD-ROM. The output devices may include, by way of example only, a printer or a video display device. The input devices may include, by way of example only, an Internet or other network connection, a mouse, a keypad, or any other device that allows an operator to enter data into the computer circuitry 80.

While the present invention has been disclosed in detail, those of ordinary skill in the art will recognize and appreciate that the invention is not so limited. Those of ordinary skill in the art will recognize and appreciate that many additions, deletions and modifications to the disclosed embodiment and its variations may be implemented without departing from the scope of the invention, which is limited only by the appended claims and their legal equivalents.

What is claimed is:

1. An interface circuit configured to drive and receive data on a data bus, the interface circuit comprising:
    a driving path configured to drive data to the data bus upon receiving a first signal, the driving path comprising:
        a driver configured to be electrically coupled to the data bus; and
        a first driving path register electrically coupled to the driver, the first driving path register configured to latch data to the driver upon receiving the first signals;
    a receiving path electrically configured to receive data from the data bus upon receiving a second signal; and
    time borrowing circuitry configured to dynamically delay the first signal and to provide the second signal.

2. The interface circuit of claim 1, wherein the driving path further comprises a second driving path register electrically coupled to the driver, the second driving path register configured to latch a third signal to the driver, wherein the driver is further configured to drive only upon receiving the third signal.

3. An interface circuit configured to drive and receive data on a data bus, the interface circuit comprising:
    a driving path configured to drive data to the data bus upon receiving a first signal;
    a receiving path electrically configured to receive data from the data bus upon receiving a second signal, the receiving path comprising:
        a receiver configured to be electrically coupled to the data bus; and
        a receiving path register electrically coupled to the receiver, the receiving path register configured to latch data received from the receiver upon receiving the second signal;
    time borrowing circuitry configured to dynamically delay the first signal and to provide the second signal.

4. An interface circuit configured to drive and receive data on a data bus, the interface circuit comprising:
    a driving path configured to drive data to the data bus upon receiving a first signal;
    a receiving path electrically configured to receive data from the data bus upon receiving a second signal; and
    time borrowing circuitry configured to dynamically delay the first signal and to provide the second signal, wherein the time borrowing circuitry is further configured to provide the dynamically delayed first signal as the second signal, and to provide the first signal as the second signal upon receiving a third signal.

5. The interface circuit of claim 4, wherein the time borrowing circuitry comprises a delay line configured to receive the first signal and to output the dynamically delayed first signal.

6. The interface circuit of claim 4, wherein the time borrowing circuitry comprises:
    a delay line configured to receive the first signal and to output the dynamically delayed first signal; and
    a multiplexer electrically coupled to both the first signal and the dynamically delayed first signal, the multiplexer configured to output the first signal only upon receiving the third signal.

7. The interface circuit of claim 4, wherein the time borrowing circuitry is further configured to receive the third signal when the driving path is driving data onto the data bus.

8. The interface circuit of claim 7, wherein the time borrowing circuitry is further configured to receive the third signal only at select time intervals to prevent glitch on the second signal.

9. The interface circuit of claim 8, wherein the time borrowing circuitry comprises:
    a delay line configured to receive the first signal and to output the dynamically delayed first signal;
    a multiplexer electrically coupled to both the first signal and the dynamically delayed first signal, the multiplexer configured to output the first signal only upon receiving the third signal;
    a NOR gate electrically coupled to both the first signal and the dynamically delayed first signal; and
    a latch electrically coupled to the output of the NOR gate, the latch configured to latch the third signal to a select line of the multiplexer when the first signal and the dynamically delayed first signal are both at a low logic level.

10. A logic device comprising an interface circuit configured to drive and receive data on a data bus, the interface circuit comprising:
    a driving path configured to drive data to the data bus upon receiving a first signal;
    a receiving path configured to receive data from the data bus upon receiving a second signal; and
    time borrowing circuitry configured to dynamically delay the first signal, to provide the second signal, to provide the dynamically delayed first signal as the second signal, and to provide the first signal as the second signal upon receiving a third signal.

11. The logic device of claim 10, wherein the time borrowing circuitry is further configured to receive the third signal when the driving path is driving data onto the bus.

12. The logic device of claim 11, wherein the time borrowing circuitry is further configured to receive the third signal only at select time intervals to prevent glitch on the second signal.

13. A computer system comprising computer circuitry, the computer circuitry comprising:
    a data bus; and
    a plurality of logic devices electrically coupled to the data bus, at least one of the plurality of logic devices comprising:
        an interface circuit configured to drive and receive data on the data bus, the interface circuit comprising:
            a driving path electrically coupled to the data bus, the driving path configured to drive data upon receiving a first signal;
            a receiving path electrically coupled to the data bus, the receiving path configured to receive data upon receiving a second signal; and
            time borrowing circuitry configured to dynamically delay the first signal, to provide the second signal, to provide the dynamically delayed first signal as the second signal, and to provide the first signal as the second signal upon receiving a third signal.

14. The computer system of claim 13, further comprising:
    a data input device electrically coupled to the computer circuitry;
    a data output device electrically coupled to the computer circuitry; and a data storage device electrically coupled to the computer circuitry.

15. The logic device of claim 13, wherein the time borrowing circuitry is further configured to receive the third signal when the driving path is driving data onto the bus.

16. The logic device of claim 15, wherein the time borrowing circuitry is further configured to receive the third signal only at select time intervals to prevent glitch on the second signal.

17. A method of increasing the speed of a common-clock data bus, the method comprising:
    determining a first delay time of a first data bit, the first delay time comprising an amount of time between the time when the first data bit is driven by a first driver coupled to the data bus and the time when the first data bit is received by a receiver coupled to the data bus;
    driving the first data bit upon detecting a first period of a first signal, the first period of the first signal being less than the first delay time;
    borrowing time from the first period of the first signal to create a second signal having a first period greater than the first delay time;
    driving a second data bit upon detecting a second period of the first signal;
    receiving the first data bit upon detecting a second period of the second signal; and
    receiving a third signal for borrowing time from the second period of the first signal such that the second period of the second signal is greater than the first delay time, the third signal received when a second delay time of the second data bit is less than the time borrowed, the second delay time comprising an amount of time between the time when the second data bit is driven by a second driver coupled to the data bus and the time when the second data bit is received by the receiver coupled to the data bus.

18. The method of claim 17, wherein borrowing time from the first period of the first signal comprises dynamically delaying the first period of the first signal with a delay line.

19. The method of claim 17, further comprising preventing glitch on the second period of the second signal by receiving the second signal only during predetermined time intervals.

20. An interface circuit configured to drive and receive data on a data bus, the interface circuit comprising:
    means for determining a first delay time of a first data bit, the first delay time comprising an amount of time between the time when the first data bit is driven by a first driver coupled to the data bus and the time when the first data bit is received by a receiver coupled to the data bus;
    means for driving the first data bit upon detecting a first period of a first signal, the first period of the first signal being less than the first delay time;
    means for borrowing time from the first period of the first signal to create a second signal having a first period greater than the first delay time;
    means for driving a second data bit upon detecting a second period of the first signal;
        means for receiving the first data bit upon detecting a second period of the second signal; and
        means for borrowing time from the second period of the first signal upon receiving a third signal such that the second period of the second signal is greater than the first delay time, the third signal is received when a second delay time of the second data bit is less than the time borrowed, the second delay time comprising an amount of time between the time when the second data bit is driven by a second driver coupled to the data bus and the time when the second data bit is received by the receiver coupled to the data bus.

21. The interface circuit of claim 20, wherein the means for borrowing time from the first period of the first signal comprises means for dynamically delaying the first period of the first signal with a delay line.

22. The interface circuit of claim 20, further comprising means for preventing glitch on the second period of the second signal by receiving the second signal only during predetermined time intervals.

* * * * *